United States Patent [19]
Taylor et al.

[11] Patent Number: 4,621,186
[45] Date of Patent: Nov. 4, 1986

[54] THERMALLY-SENSITIVE CONTROL ARRANGEMENT FOR CONTAINERS PROVIDED WITH ELECTRIC IMMERSION HEATERS

[75] Inventors: John C. Taylor, Ballasalla; Phillip G. Binns, Port Erin, both of Isle of Man

[73] Assignee: Strix Limited, United Kingdom

[21] Appl. No.: 449,810

[22] Filed: Dec. 14, 1982

[30] Foreign Application Priority Data

Dec. 16, 1981 [GB] United Kingdom ................. 8137993

[51] Int. Cl.[4] .......................... H05B 1/02; H05B 3/82; A47J 27/62; H01H 37/54

[52] U.S. Cl. .................................... 219/330; 219/328; 219/336; 219/437; 219/441; 337/336; 337/371; 337/380

[58] Field of Search ............... 219/328, 331, 437, 436, 219/438, 441, 442, 335, 336, 330; 337/335, 336, 337, 380, 371

[56] References Cited

U.S. PATENT DOCUMENTS 4,358,666 11/1982 Taylor ........................... 219/328 X

FOREIGN PATENT DOCUMENTS 2301523 7/1973 Fed. Rep. of Germany ...... 219/328
657434 9/1951 United Kingdom .
1415843 11/1975 United Kingdom .
1430229 3/1976 United Kingdom ................ 219/437
1470366 4/1977 United Kingdom .
1542252 3/1979 United Kingdom .
2052227 1/1981 United Kingdom ................ 219/437
2042269 4/1983 United Kingdom .

*Primary Examiner*—A. Bartis
*Attorney, Agent, or Firm*—Bacon & Thomas

[57] ABSTRACT

A thermally-sensitive electrical control is mounted to the head of an electric immersion heater of an electric kettle or like container. The control has an outer periphery of less radial extent than the head so as to be passable, during assembly, through an opening in the wall of the associated container such that the head may be positioned in the opening with the control mounted thereto by insertion of the control through the opening from inside the container. The control includes an electric switch and a snap-action, overheat sensing bimetallic actuator disposed on the side of a body portion of the control which faces the head when the control is mounted thereto and a snap-action steam responsive bimetallic actuator mounted to the opposite side of the body portion. The switch is operated by the bimetallic actuators through an over-center mechanism disposed on the opposite side of the body portion and connected to the switch by a U-shaped link slidbly mounted in the body portion. Terminal pins, adapted to be engaged by a separate socket connector, are disposed on an opposite side of the control body portion. The body portion includes a shelf member which is disposed between and separates the terminals from the steam responsive bimetallic actuator and over-center mechanism.

43 Claims, 14 Drawing Figures

FIG.8.
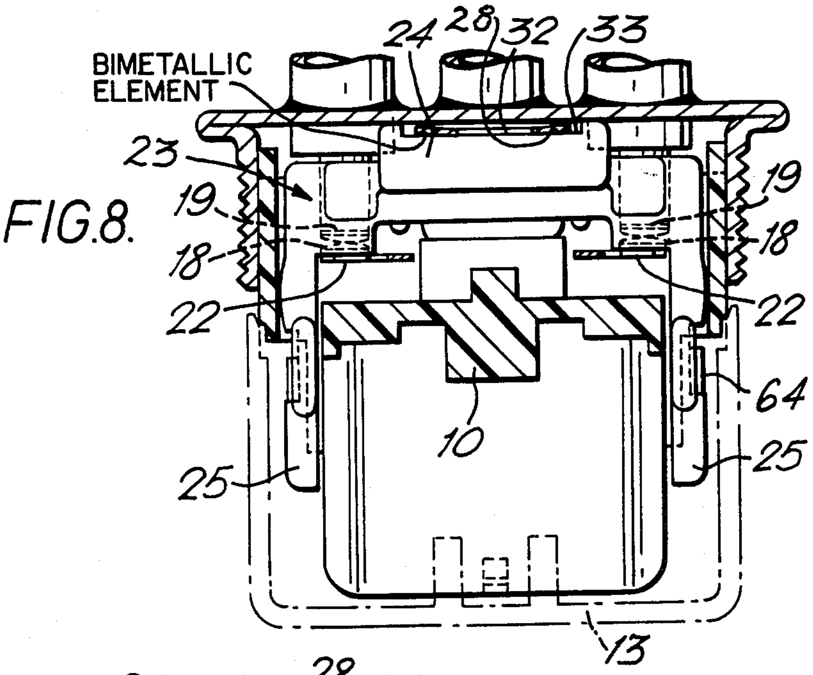
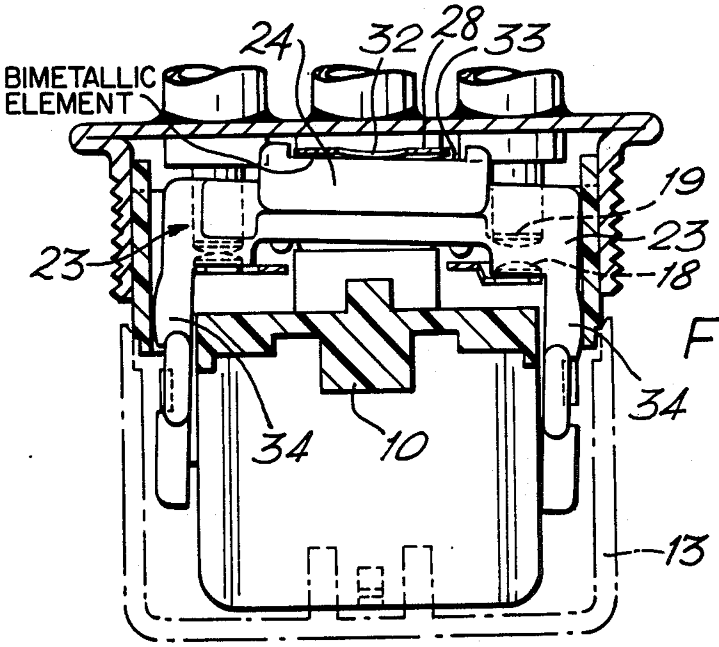
FIG.9.
FIG.10.
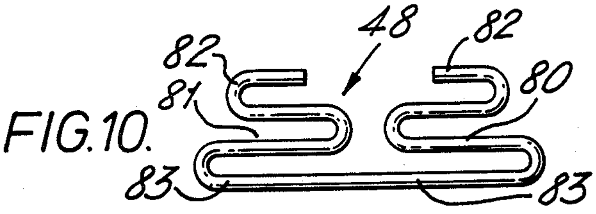

THERMALLY-SENSITIVE CONTROL ARRANGEMENT FOR CONTAINERS PROVIDED WITH ELECTRIC IMMERSION HEATERS

This invention relates to thermally-sensitive electrical controls for electric immersion heaters of containers such as electric kettles, jugs, urns, pans, coffee percolators, laboratory equipment and the like. Such immersion heaters conventionally comprise a heating element carried by a head which is adapted to be secured in a watertight manner in or adjacent an opening in the container wall. The heating elements of such assemblies terminate in so-called cold leads by means of which electrical connections are made to the heater. Such immersion heaters are referred to hereinafter as "immersion heaters of the kind described".

Thermally-sensitive electrical controls for such immersion heaters are well known which include electrical switch means adapted to make electrical contact with the cold leads of the heater and effective, in use, to interrupt the power supply to the element thereof upon either the liquid within the container boiling or the element overheating consequent upon, for example, having been switched on with insufficient liquid within the container to cover the element.

An example of of an immersion heater provided with a thermally-sensitive control as aforesaid is described with reference to FIGS. 1 to 4 of British Pat. No. 1470366 wherein an electrical control mounted externally of the container is clamped to the immersion heater head after it has been positioned adjacent the container opening. The control includes terminal pins for engagement by a female mains socket connector. One of the pins is connected to the heating element via the contacts of an electrical switch. First and second thermally responsive actuating means are provided for the switch, the first being mounted in good thermal contact with the head of the heater opposite a hot return of the element and operable so as to break the switch contacts upon the element overheating and the second being mounted adjacent a small aperture formed in the container wall above the level of the liquid therein for exposure to steam exiting from the container upon boiling of liquid therein. The second actuating means is coupled by means of an overcentre spring mechanism to the switch and is effective to open the contacts thereof upon boiling of the liquid within the container.

A drawback with this arrangement is that the container and control are specially adapted for use one with the other and therefore the type of container with which the control and associated immersion heater can be used is limited. Furthermore, as a body portion of the control which mounts the second actuating means and associated overcentre spring mechanism extends upwardly from the element head to a position adjacent the steam outlet aperture thus enabling the second actuating means to be mounted close to the aperture, the control is not particularly compact in construction and is relatively bulky in appearance. Moreover, as the control must be secured to the element head from outside the container after the head has been appropriately positioned adjacent the opening in the container wall this makes the control unsuitable for sale as a universal replacement heater for user fitting to a wide range of containers.

A further example of a thermally-sensitive control as mentioned above is described in British Pat. No.

2042269A. This arrangement differs from that described above in that it includes a switch-on-dry protector switch unit adapted to make electrical connection with the cold leads of the heating element and effective, in use, to interrupt the electrical supply to the heater should the element overheat and a separate steam sensitive unit including the second actuating means and the overcentre spring mechanism. The steam sensitive unit is adapted to be mounted on the protector switch unit and a mechanical link is provided between the overcentre mechanism and the switch unit for interrupting the power supply to the heater. The steam sensitive unit may either be adapted for use with an immersion heater carrying a tube for the egress of steam from the interior of the kettle, which tube passes through the immersion heater head, or for use with a container having a channel or passage formed at one side thereof for the transfer of steam to the control. Thus, the control may be used with a wider range of containers including, for example, both conventional electric kettles and hot-water jugs fitted with immersion heaters which are becoming increasingly popular. This control although much compactor still requires the mounting of the steam sensitive unit after the element head has been secured in the container opening and is thus unsuitable for sale to a user as a universal replacement heater for user fitting.

With the above and similar immersion heaters a further disadvantage is in that an external cover for the control, which is mounted after the heater and control have been secured to a container, has to be especially adapted for use with a particular container. Thus, while a heater and associated control might be suitable for use with a number of containers, it is often necessary to design different covers depending on the size and shape of any particular container.

A further thermally-sensitive control of the kind above referred to is described in British Pat. No. 1415843 and in this control all parts of the control for an immersion heater are of less radial extent than a permetric portion of the immersion heater head to which the control is secured so as to be passable through the opening in the container wall from the inside of the container. Thus the assembly of immersion heater and control is mountable in the wall of the container without having to disconnect and reconnect any of its operative parts. As such, the assembly of heater and control is inherently suitable for sale to the user as a replacement element and also as an assembly by means of which, for example, a non-automatic electric kettle may be converted to one which is automatically switched off when the water boils.

In the illustrated embodiment of the invention described in British Pat. No. 1415843 a power cable is permanently connected to the control by means of suitable terminals which are in turn connected via first and second thermally sensitive switches to the heating element. The switches, which are connected in series, are, in use, respectively responsive to the element overheating and to steam or vapour resulting from liquid within the container boiling, such steam or vapour being transmitted from the interior of the container via a tube carried by the element head.

The arrangement of the various components within the control requires that the control is relatively elongate and this, in use, results in a shape which may be regarded as difficult to accomodate in an aesthetically pleasing design of container and control. Furthermore, experience has shown that the provision of a detachable socket connector is highly desirable, particularly in the case of relatively portable containers such as kettles. Although, terminal pins for a detachable mains socket connector could be provided in place of the terminals for the fixed power supply cable this would result in a longitudinal extension of the control since the radial extent of the control can not be increased having regard to the need of the control to be inserted through the container wall opening from within the container. Such an increase in the length of the control would not as a practical matter be acceptable. An additional limitation of this control is that it is suitable for use only with an immersion heater which carries a tube for the egress of steam from the interior of the container via the heater head.

In accordance with the invention, there is provided a thermally-sensitive electrical control for an electric immersion heater of the kind described, said control being mountable on the head of an immersion heater and having an outer periphery of less radial extent than a peripheral portion of the head so as to be passable through the opening in the wall of an associated container. The head may be positioned in or adjacent the opening with the control mounted thereon by insertion of the control through the opening from inside the container. The control comprises a body portion with electrical switch means mounted thereto effective, in use of the control, to interrupt the power supply to the element and responsive to first and second thermally responsive actuating means respectively operable upon the element overheating and upon liquid within the container boiling. At least said second actuating means is mounted on the control and acts on said switch means through an over-centre spring mechanism and is exposed in use to steam or vapour resulting from liquid within the container boiling. Electrical parts of the control are shielded from such steam or vapour. The control further comprises terminal pins adapted to be engaged by a separate socket connector for connecting the element via the switch means to a source of electrical power, said switch means and said first actuating means being disposed on one side of the body portion which side, in use faces the element head. The overcentre spring mechanism and the second actuating means are mounted to the other side of the body portion and are disposed to one side of a generally axial plane of the control. The free end portions of the terminal pins of the control are disposed to the other side of said generally axial plane generally opposite said overcentre spring mechanism and said second actuating means.

The general arrangement of the components of a control according to the invention is such that those parts of the control which are in use positioned externally to an opening in the wall of an associated container are of less radial extent than the opening and as such the control may be passed through the opening from within the container. Moreover, the configuration provides an extremely compact control which incorporates so-called switch-on-dry protection, steam sensitive switching and terminal pins for a separate detachable socket connector and which may be mounted to the head of an immersion heater prior to securing the head, with the control mounted thereto, in or adjacent a container opening. Thus, a reduction in the overall bulkiness of the control as compared with known arrangements is combined with increased ease of fitting. The mounting of the plug pins and the over-centre mechanism to a single body portion enables the body portion conveniently to be integrally moulded.

The manner in which the control is adapted for impingement of steam on the second thermally responsive actuating means could be different depending on the nature of the container and/or immersion heater with which the control is intended for use. In a first instance, the control may be adapted to receive steam or vapour egressing from the interior of a container via a tube carried by the element head which tube passes through the head and extends above water level within the container. Alternatively, the introduction of steam or vapour to the second actuating means may be laterally from above as viewed when the control is mounted adjacent a side wall and near the base of an associated container and therefore the control may be adapted for use with, for example, a container having a tube or passage running down the outside thereof and communicating with a steam or vapour aperture in the upper wall of the container. The tube or passage may be concealed or formed within a handle structure of the container or alternatively be defined between the handle structure and the container wall.

In both the above instances the control is passable through the opening in the container wall and in both cases, if desired, can be mounted to an immersion heater before the head thereof is secured in or adjacent the container opening.

The control may conveniently be provided with a cover member which is mountable to the body member and which encloses the over-centre spring mechanism and the terminal pins. The cover member advantageously defines a shroud which surrounds the terminal pins and serves as a guide for a separate female socket connector. In one particularly advantageous arrangement the cover member is shaped so as to also be passible through a standard container opening. Thus, when used with an immersion heater of the type having a head which carries a tube for the egress of steam or vapour from the interior of a container, the entire control may be mounted to the head of the heater by the manufacturer and the heater may be sold completely with the control as a universal replacement assembly for user fitting. In this way, for example, a conventional manual electric kettle having a standard opening for the element head may be converted by its owner to automatic which is de-energised upon overheating of the element and upon boiling simply by replacing an existing element with an immersion heater fitted with a control according to the invention. Thus, an immersion heater fitted with the inventive control might be substituted for an existing element either after the existing element has "burnt-out" or where it is desired that an originally conventional container be converted to one having the advantages of automatic control. Furthermore, a heater with a fully tested control mounted thereto may be sold to a retailer, distributor or container manufacturer by a single manufacturer. This represents a considerable advantage in that previously heater and controls have generally been supplied by different manufacturers and assembled by the container manufacturers and this could lead to problems in ascribing responsibility if the assembly of control and heater proved faulty.

In an alternative arrangement, the cover member may be formed as part of a larger housing incorporated in or mountable to the container wall. It is envisaged that this might be the case when the control is used with an immersion heater of, for example, a styled hot water jug formed from a moulded plastic material wherein a cover for the control might conveniently be integrally moulded with the jug. It should be appreciated that the advantage of ease of fitting still applies with such an arrangement since a faulty element and/or control may easily be replaced by insertion from inside the container without electrical or mechanical connections being made to the control.

In a control according to the invention, the over-centre spring mechanism and the terminal pins are mounted to the control body portion on opposite sides of a generally axial plane of the control i.e. a plane which includes the generally central longitudinal axis of the control. In a preferred embodiment, the body portion includes a shelf member which is substantially parallel and closely adjacent to the said axial plane and which co-operates with the cover member shroud to shield the terminal pins from steam or vapour impinging on the second thermally responsive actuating means. In use, the axial plane and the shelf are advantageously horizontal and the terminal pins extend below the shelf, i.e. towards the bottom of the control, and the over-centre spring mechanism is disposed above the shelf. The control is preferably provided with three terminal pins disposed in a generally triangular relationship and adapted for use with a standard International 10 amp socket connector. The central or earth pin is preferably disposed below the live and neutral pins, i.e. close to the outer periphery of the control. Such an arrangement is an inversion of the normal pin configuration and enables the pins to be accomodated closer to the outer periphery of the control thus increasing the space available for the second actuating means and over-centre spring mechanism.

In a preferred embodiment, the switch means includes two sets of contacts which are breakable in response to operation of the first actuating means to interrupt the power supply to the heater upon the element thereof overheating after, for example, having been switched on dry. The switch means preferably comprises two movable contacts, respectively mounted to the free ends of two generally 'U' shaped leaf springs formed from a resilient conductive strip material which springs are respectively secured at their ends remote from the contacts to the back ends of the live and neutral terminal pins. The movable contacts are preferably adapted to make electrical contact with a pair of stationary contacts respectively mounted directly to the cold leads of the immersion heater such that in normal use each leaf spring urges its associated contact against the respective stationary contact. The stationary contacts may be conveniently be mounted to the cold leads by means of suitable cylindrical sleeves secured to the contacts, the sleeves being pushed over the ends of the leads.

The mounting of the stationary contacts directly to the cold leads simplifies the design of the control as compared with known arrangements wherein a single stationary contact has generally been mounted on a suitable conductive member which is in turn connected to a cold lead. Furthermore, the requirement of spring clips or the like mounted on the control body for making electrical connections to the cold leads associated with known controls is avoided. This represents a considerable simplification with regard to manufacture and assembly of the control to an immersion heater.

Preferably, the two sets of contacts are independently breakable in response to operation of the first actuating means. This is significant from the safety point of view in that, in the event of one set of contacts becoming welded together after an extended period of use, the other set will remain breakable in response to the actuating means should the element overheat. This feature is particularly important where the control is fitted to an immersion heater of an appliance which in general use is likely to be left unattended for extended periods of time, e.g. an automatic early morning tea maker.

The switch means is preferably coupled to the first actuating means and to the over-centre spring mechanism by means of a link member which is mounted to the body portion and is slidable relative thereto in or closely adjacent to said generally axial plane of the control. The link member is preferably generally U-shaped and comprises a transverse arm adapted for engagement with the free ends of the leaf springs and two spaced longitudinal arms extending through spaced longitudinal channels in the body portion to the side of the body portion remote from the switch means. In use, the link member is preferably acted on indirectly or directly by the overcentre mechanism and the first thermally responsive actuating means so as to be displaced in a generally axial direction away from the heater head thereby engaging the leaf springs and opening one or both of the sets of contacts and interrupting the power supply to the element.

The first thermally responsive actuating means may be mounted on the heater head or on the control and may take any convenient form such as for example, a memory metal device. Preferably, however, the actuating means comprises a snap-acting bimetallic actuator in the form of a stressed sheet of bimetal having a dished configuration which will snap between two oppositely dished configurations with changes in temperature. One such actuator is described in British Pat. No. 657,434 wherein a 'U'-shaped portion has been cut away from a bimetal sheet to define a central tongue and a bridge or margin portion adjacent the free end of the tongue. The bridge portion or margin is crimped to draw the legs together to impart the required dished configuration. Alternatively the bimetallic actuator may be of the type described in British Pat. No. 1,542,252 wherein a central tongue is provided but the actuator is preformed to a domed configuration in a die pressing operation.

In a preferred arrangement the bimetallic actuator is mounted so as to be spaced from and overlie the bases of the terminal pins of the control and is disposed for direct engagement with an abutment surface formed on the link member transverse arm.

Preferably the bimetallic actuator is mounted by means of a bridge member which is in use clamped between the heater head and the control body portion at either side of the terminal pins and which extends across the bases of the pins. The bimetallic actuator may be permanently secured to the bridge member as by means of rivetting. Preferably, however, the bimetallic actuator is secured to the bridge member by means defining a mount for the bimetallic actuator into which the actuator may be introduced and from which it may be removed without damaging the mount or control. Thus, if a control is rejected during testing because, for example, the first thermally responsive actuating means responds at the wrong temperature, the bimetallic actuator can be easily replaced without damaging the control. Where the bimetallic actuator is of the sort discussed above having a tongue formed therein, the mount therefor may conveniently include two folded-over 'ears' which embrace the edges of the tongue and a small ramp which enters a small aperture in the tongue when the tongue is pushed into place between the ears.

Preferably, the bridge member is made of a material of low thermal conductivity and/or low heat capacity such as stainless steel and serves to accurately align the actuator with the element head when the control is mounted to the head so as to ensure good thermal contact with the head. Desirably the head is provided with a shaped protrusion conforming to the curvature of the bimetallic actuator to improve heat transfer from the hot return of the element which is brazed to the heater head adjacent said protrusion.

Furthermore, where the material of the bridge member is of low thermal conductivity, heat-loss from the bimetallic actuator is minimised and a quicker thermal response obtained so that an actuator having a higher operating temperature may be chosen, e.g. with a nominal operating temperature of 140° C., which minimises so-called 'nuisance' tripping of the actuator due to, for example, a heating element operating slightly above its normal temperature owing to scale being formed on the surface of the element in hard water areas.

A configuration of control involving a link member slidable in or closely adjacent to the general axial plane of the control and a first actuating means in the form of a bimetallic actuator of the kind described in British Patent Specification Nos. 657434 or 1542252 mounted on a bridge member so as to overlie the bases of the terminal pins enables the bimetallic actuator to be mounted so that the bridge portion thereof opposite the free end of the tongue actuates the link member and the operative part of the actuator, i.e., the part in the region of the tongue root, is adjacent the periphery of the control which in turn means that the hot return of the elment can be brazed to the head in the, in use, lowermost region thereof. This enables a low profile element to be provided i.e. one in which all the heated part of the element can be positioned close to the base of a container to which it is fitted, the advantage being that only a relatively small volume of liquid is required to cover the element and can therefore be boiled with resulting energy saving.

Preferably, the over-centre mechanism includes a lever member pivotably mounted on the body portion so as to be movable between first and second stable positions through an unstable dead-centre position. The pivotal mounting is preferably by means of at least one knife edge engaging in a notch and being retained in the notch by means of a spring extending between the lever and the body portion. With such an arrangement, the dead centre position occurs when the two ends of the spring lie in a common plane with the fulcrum of the lever. Advantageously, the spring is a wire spring including two arms which with the spring mounted in the control are generally parallel and are interconnected by a generally 'V' or 'U' shaped portion lying in the plane of and disposed between the parallel arms. Such a spring, while providing adequate biasing of the lever member into either of its stable positions, has a sufficiently low rate and can accommodate a relatively large angular movement and compression as the lever is tripped.

In a preferred embodiment, the lever member includes two said knife edges respectively resting in notches formed in two spaced arms projecting from the body portion on the side thereof remote from the switch means. The arms preferably have abutment surfaces formed thereon which co-operate with the lever member so as to define stops for said first and second stable positions. In this embodiment, a combined double spring may be used, one arm being common to both springs so that two 'U' or 'V' shaped portions are disposed in back-to-back relation. Preferably, the dead centre position of the lever occurs when the ends of the spring lie parallel to the said axial plane of the control.

Advantageously, the lever member includes two spaced legs which are adapted for engagement with suitable abutments such as the ends of grooves formed on the respective arms of the 'U' shaped link member whereby, in use of the control, upon the lever being tripped from its first stable position to its second stable position the legs thereof engage such abutments and pull the link member in a direction away from the immersion heater head thereby causing the transverse arm of the link member to open the contacts of the switch means.

The second thermally responsive actuating means which serves to trip the overcentre spring mechanism can taken any convenient form and can advantageously comprise a snap-action bimetallic actuator as described above in relation to the first thermally responsive actuator but set to operate at a lower nominal temperature, e.g. 80° C. Such a bimetallic actuator is preferably mounted on the body portion so as to lie at an acute angle to the said axial plane of the control and may conveniently be located within the control between support members formed on the body portion and a projection on the body portion shelf. The relatively flat disposition of the second bimetallic actuator in relation to the axial plane of the control is preferable in that the radial space taken up by the actuator is reduced as compared with, for example, most known controls wherein the steam sensitive bimetallic actuator is generally mounted normal to the axis of the control.

As discussed above the control may be adapted for impingement of steam or vapour on the second thermally responsive actuating means in various ways. In one embodiment, where the immersion heater head carries a tube for the egress of steam from inside the container via the head, a bore or aperture is formed in the body portion through which steam or vapour emitting from the tube outlet may pass and which communicates with the second actuating means. The outlet of the steam tube must be sealed within or to the bore or aperture to prevent the steam or vapour impinging on the switch means. In known arrangements this has been achieved by the tube extending into the aperture and being sealed therein by means of resilient O-rings. However, in accordance with a further preferred feature of the present invention, the steam tube does not extend into the aperture and instead the seal is effected by a resilient sleeve, one end of which is pushed over the tube and the other end of which is disposed within the aperture, which is preferably tapered at its end so as to easily accept the sleeve and compress and seal the end of the sleeve.

The use of a resilient sleeve is convenient from the manufacturers point of view in that, unlike previous arrangements, the steam tube outlet need not be precisely positioned within the head relative to the body portion aperture since the sleeve will accommodate slight misalignment between the tube and the aperture. Furthermore, since the tube is not disposed within the aperture, the diameter of the tube may be increased relative to the diameter of the aperture, the difference in diameters being accommodated by a taper in the sleeve.

Thus, a larger diameter steam tube may be used as compared with known arrangements wherein the diameter has had to be less than the aperture diameter which is restricted by the space available therefor within the control body portion. This represents a significant advantage in that with a larger bore of steam tube the possibility of the tube becoming blocked due to vapour condensing therein is reduced. This problem is often significant where the heater is sold as a replacement unit for fitting to a wide range of containers since many standard containers are not adapted for use with a steam tube and as such the steam pressure therein during boiling might be insufficient to adequately force the steam through a narrow bore tube.

Preferably, the control is adapted for use with an immersion heater having an externally threaded cup-like head which is adapted to be inserted through a container opening and is retained therein by means of an externally mounted locking ring. In this embodiment, the control body has a generally cylindrical peripheral wall and the body is securable within the cup-like head by means of bolts which pass through the body portion and are threaded into studs mounted on the head. The cover is advantageously mounted to the control by means of a single central fixing bolt. The earth terminal pin may conveniently be electrically connected to the head by means of a resilient conductive strip which is mounted to the earth pin and bears against the inside of the cup-like head when the control is mounted thereto. This configuration is inherently suitable for attachment to an immersion heater for sale as a replacement element; it is compact and relatively cheap to produce since it comprises relatively few separate components.

This invention extends to a thermally-sensitive electrical control in accordance with the invention in combination with an electric immersion heater.

Preferred embodiments of the invention will now be described, by way of example only, with reference to the accompanying drawings in which:

FIG. 8 is a view similar to FIG. 7 but showing the switch contacts closed.

FIG. 9 is a view similar to FIGS. 7 and 8 but showing one contact open and one closed.

FIG. 10 is a plan view of the over centre spring for the control illustrated in FIGS. 1 to 9.

Figure 4:
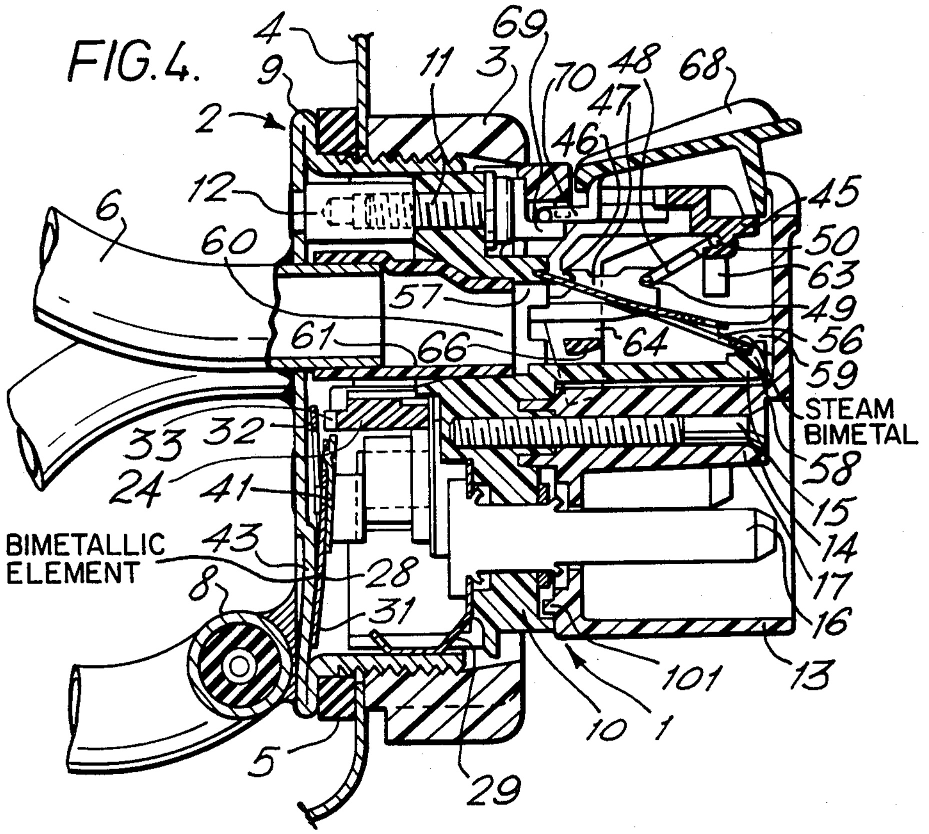
FIG. 4 is a cross-sectional view taken from one side of the control of FIGS. 1 to 3 mounted to the head of an immersion heater showing the overcentre spring mechanism in the deactivated position.

Referring firstly to FIGS. 1 to 5, a thermally-sensitive control 1 is mounted on the head 2 of an electric immersion heater. The cup-like head 2 is retained in a watertight manner in an opening formed in the wall 4 of an associated container by means of an externally threaded retaining ring 3 which urges a peripheral flange 9 of the head 2 against the inside of the wall 4 compressing a resilient O-ring seal 5 therebetween as shown in FIG. 4. The immersion heater head 2 carries a tube 6 for the egress of steam from the interior of the containter which tube is brazed to the head and extends, in use, above water level within the container. The immersion heater comprises two cold leads 7 and a hot return 8 which passes underneath the cold leads 7 and is brazed to the head 2 so as to be in good thermal contact therewith. The low position of the hot return 8 enables the container to boil small quantities of liquid if desired.

The control 1 comprises a body portion 10 of thermoplastic material, mounted snugly within the head 2 by means of three bolts 11 which engage threaded female studs 12 brazed to the inside of the head, and a cover member 13 which is secured to the body portion 10 by means of a single central fixing bolt 14. The body portion 10 includes a horizontal shelf member 15 which lies close to the central longitudinal axial plane of the control 1 and defines at the side of the body portion remote from the head, upper and lower segmental volumes of the control lying respectively above and below the central horizontal axial plane of the control. Three terminal pins 16 are secured to and extend through the body portion 10 and include a live pin, a neutral pin and an earth pin for connection to a female socket connector to supply mains electrical power to the heating element. The end portions of the pins 16, which extend parallel to and are disposed below the shelf member 15, are arranged in a triangular relationship with the central or earth pin lying below the live and neutral pins. The cover member 15 defines a shroud 17 which surrounds the pins 16 and is shaped so as to snugly receive a standard socket connector.

Figure 1:
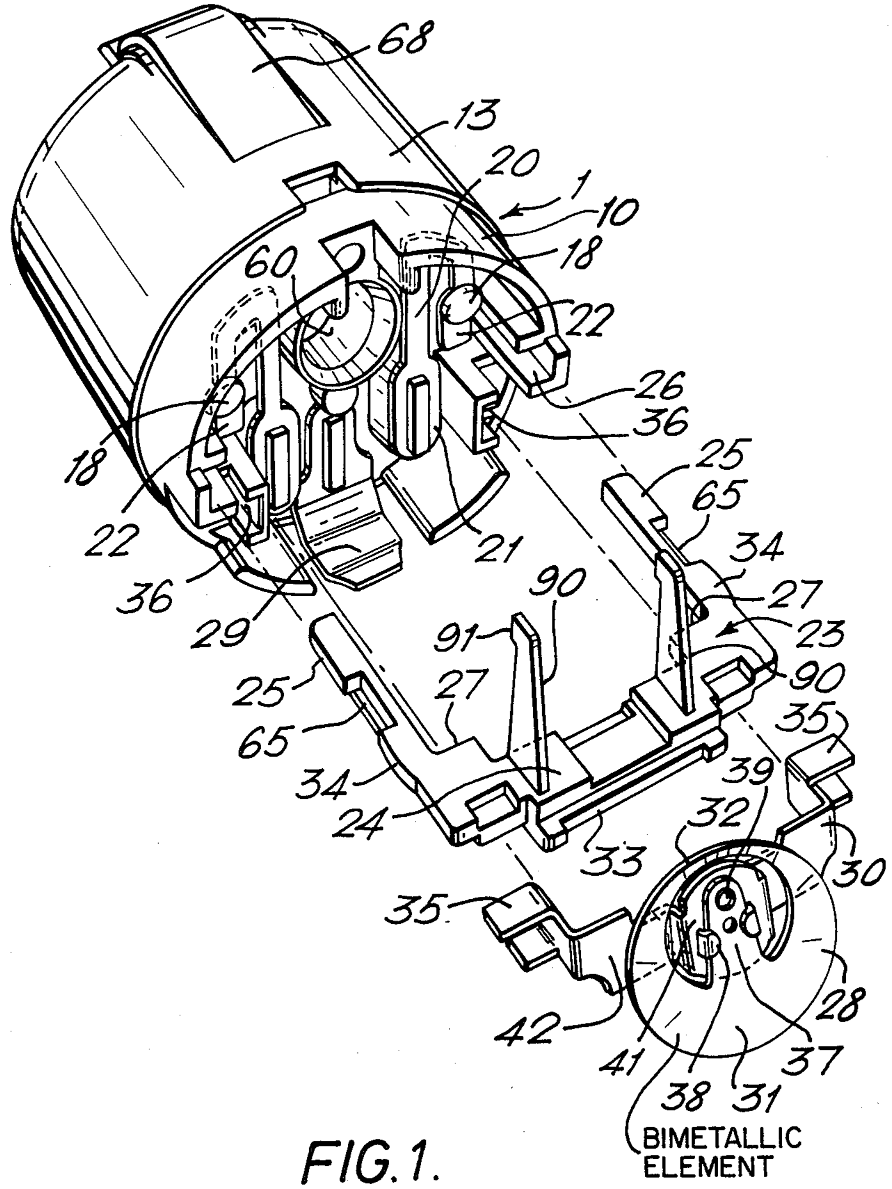
FIG. 1 is an exploded perspective view of a control in accordance with the invention taken from the side of the control which in use is secured to an immersion heater head.
Figure 2A:
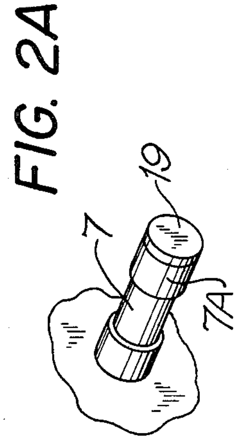
FIG. 2A is a partial, perspective view of an alternative embodiment of the stationary contacts of the control.
Figure 2:
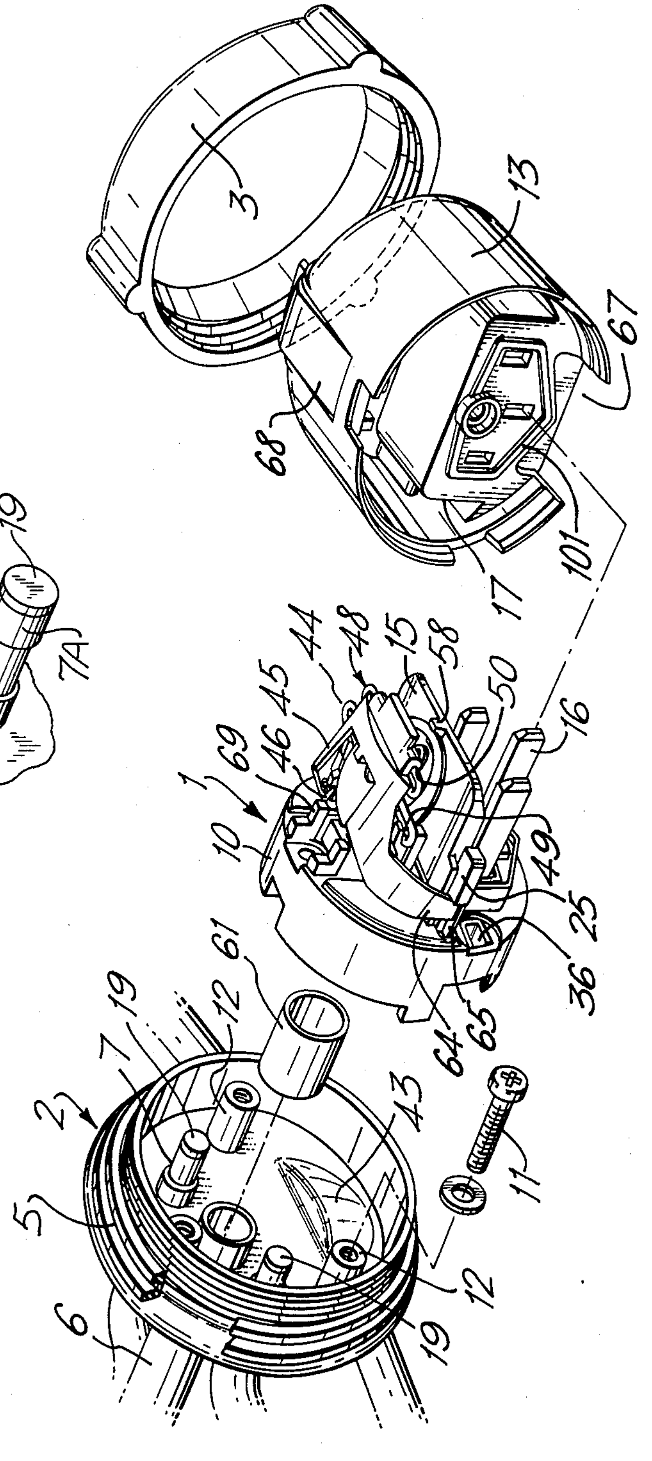
FIG. 2 is an exploded perspective view of the control illustrated in FIG. 1 taken from the opposite side of the control and showing the immersion heater head.
Figure 3:
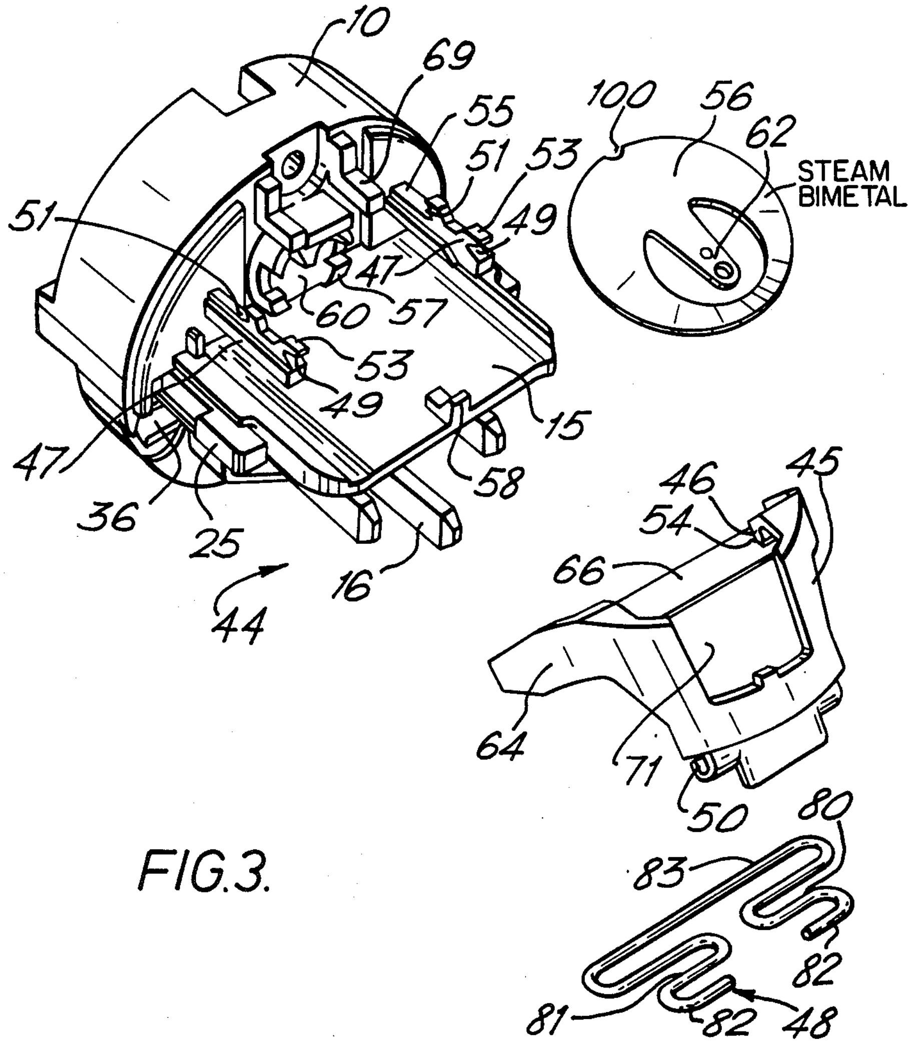
FIG. 3 is a perspective view similar to FIG. 2 with certain parts of the control removed.

The live and neutral pins are each connected to a respective cold lead 7 via a pair of breakable contacts, each pair including a movable contact 18 and a stationary contact 19 mounted directly to a respective cold lead 7. The stationary contacts 19 may be mounted to the cold leads 7 by any known means, such as cylindrical spring clips. Alternatively, the stationary contacts 19 might be mounted to the cold leads 7 by means of interference-fitted sleeves 7A, shown in FIG. 2A. The movable contacts 18 are mounted towards the free ends 22 of respective generally 'U'-shaped leaf springs 20 formed from resilient metallic strip material. The leaf springs 20 extend upwardly adjacent the side of the body portion 10 facing the head from the bases of the respective live and neutral terminal pins and are secured thereto by means of apertured base portions 21 of the leaf springs 20 which surround the base portions of the pins. During normal operation of the heater, the leaf springs 20 urge the movable contacts 18 against the respective stationary contacts 19 and electrical power may be supplied from the live and neutral terminal pins to the element. The earth pin, by virtue of its disposition towards the outer periphery of the control, is conveniently electrically connected with the head 2 by means of a metallic spring clip 29 which is secured to the base of the pin and directly engages the inside of the head 2.

A generally 'U' shaped link member 23 of a moulded plastics material lies in a horizontal plane of the control slightly below the switch contacts 18, 19 and includes a transverse arm 24 disposed between the body portion 10 and the head 2, beneath the contacts, and two spaced longitudinal arms 25. The longitudinal arms 25 extend through the body portion 10 and are slidably mounted in axially directed channels 26 formed on either side of the body portion 10 close to the outer periphery thereof. The transverse arm 24 of the link member 23 includes two stepped abutments 27 at either end thereof adjacent the longitudinal arms 25 which abutments 27 are adapted to engage respective free ends 22 of the leaf springs 20 whereby movement of the link member 23 in a direction away from the head 2 causes the free ends 22 of the springs 20 and the respective movable contacts 18 to be displaced in a direction away from the head 2 thereby opening the contacts and interrupting the power supply to the heater. During displacement of the free ends of the 'U' shaped leaf springs, the springs are caused to both pivot and twist about their mountings. This causes a relative lateral movement between the movable contacts and the stationary contacts as they are opened or closed which results in the surfaces of the contacts being self-cleaning.

In addition, two vertical abutment arms 90 extend upwardly from the link member transverse arm 24 which are provided with abutment surfaces 91 adapted for engagement with the uppermost portions of the respective leaf springs 20. Upon displacement of the link member 24 away from the head, the abutment surfaces 91 engage the leaf springs slightly after engagement thereof by the abutments 27 and urge the contacts further apart.

Figure 7:
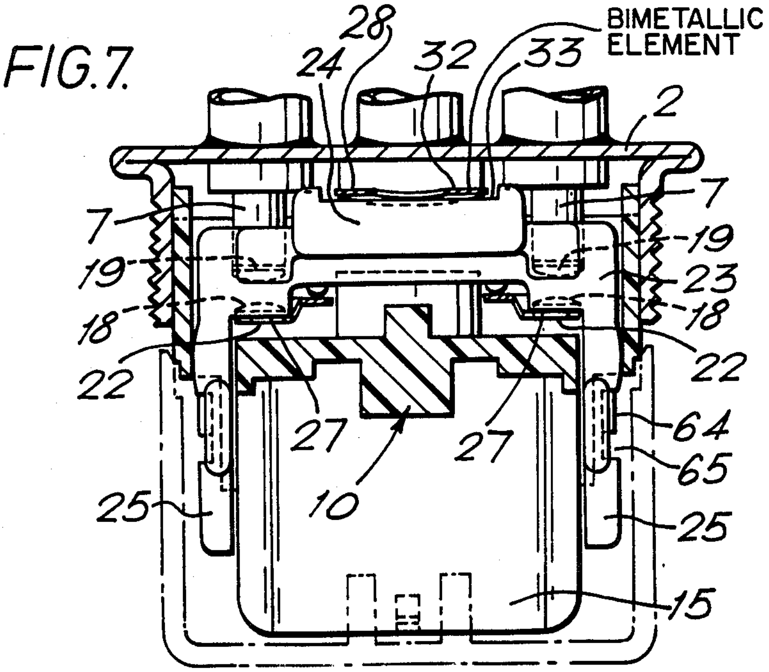
FIG. 7 is a cross-sectional view taken along line 7—7 in FIG. 6 showing the switch contacts open.

The first thermally responsive actuating means comprises a snap-action bimetalic actuator 28 of the sort described in British Pat. No. 1,542,252. The bimetallic actuator 28 is mounted on a stainless steel bridge member 30 as described in more detail below and overlies the bases of the terminal pins 16. A lower peripheral portion 31 of the actuator 28 is held in good thermal contact with wedge-shaped protrusion 43 formed on the inside of the head 2 towards the bottom thereof adjacent to the point where the hot return 8 of the element is welded thereto, and an upper bridge portion 32 of the actuator 28 is adapted for engagement with a central abutment surface 33 formed on the 'U'-shaped link member 23. The actuator 28 is calibrated with a nominal operating temperature of 140° C. so as to undergo snap action when the element overheats. Thus, when the element overheats after for example having been switched on dry, the actuator 28 reverses its curvature by snap-action whereupon the bridge portion 32 engages and moves rightwardly, i.e. away from the head, the link member 23 which in turn pushes the movable contacts 18 away from the stationary contacts 19 as shown in FIG. 7 so as to cut off the power supply to the heating element.

An important safety feature of the preferred control arises from the fact that the 'U'-shaped link member 23 in addition to being slidable in a substantially axial direction is pivotable to a limited extent in its horizontal plane about a vertical axis. Such pivotal movement is accomodated by the outer edges of the longitudinal arms 25 of the link member 23 being contoured within the channels 26 so as to define curved surfaces 34 which abut the outer wall of respective channels 26 therebeing a lateral clearance between the major part of the edges of the arms 25 and the channels 26. Thus, in the event of either pair of contacts 18, 19 becoming welded together after an extended period of use, upon operation of the actuator 28 engagement of the bridge portion 32 thereof with the abutment surface 33 of the link member 23 will cause the link member 23 to pivot about the welded-together pair of contacts and open the remaining pair as shown in FIG. 9 thereby de-energising the heater. This additional safety feature is particularly significant where the container forms part of an appliance which in general use is likely to be left unattended for extended periods of time such as, for example, an early morning tea maker.

Figure 11:
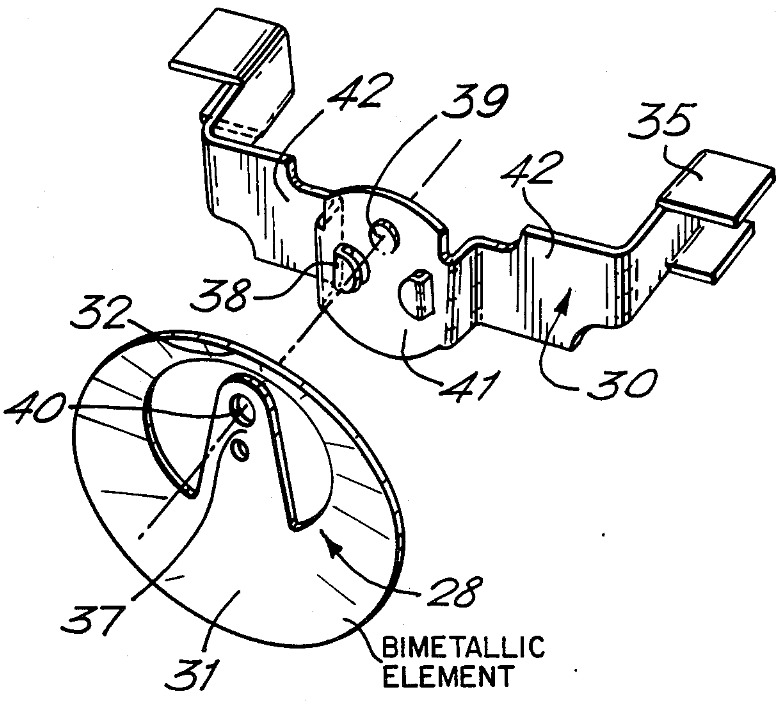
FIG. 11 is a perspective view of the bridge member which mounts the first thermally responsive actuator.
Figure 12:
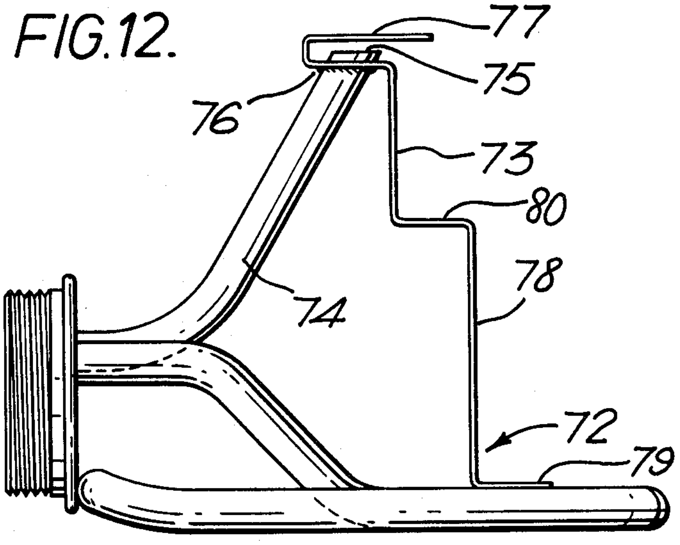
FIG. 12 is a side elevational view of an immersion heater.
Figure 13:
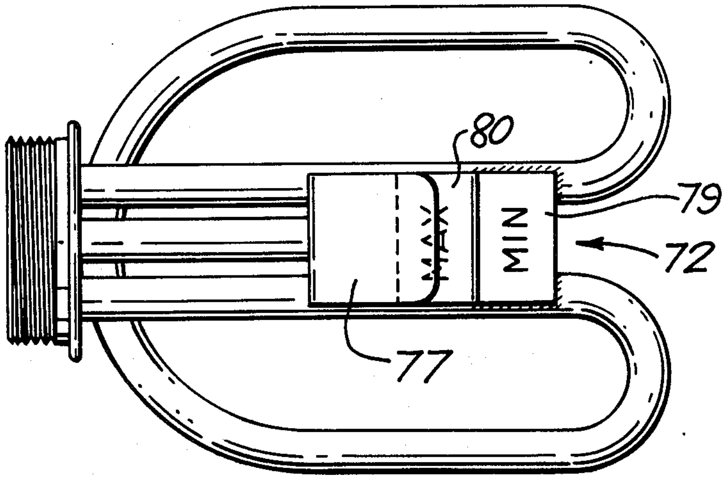
FIG. 13 is a plan view of the immersion heater illustrated in FIG. 12.

The stainless steel resilient bridge member 30, shown most clearly in FIG. 11, includes a pair of spaced lateral flanges 35 projecting from each side thereof which fit snugly within respective generally rectangular apertures 36 formed at either side of the body portion 10 and through which the lowermost two of the body portion mounting bolts 11 extend. As the bolts 11 are tightened, the flanges 35 bear directly against the respective female studs 12 of the head and are firmly clamped between the heads of the respective bolts 11 and the studs 12 within the apertures 36. In this way, the stainless steel flanges 35 act as spacers between the heads of the mounting bolts 11 and the ends of the studs 12 and prevent undue stresses being imparted to the plastic body portion as is bolted to the head. Thus, the body portion may be tightly clamped to the head without the possibility of inadvertently damaging the plastic by overtightening the lowermost bolts.

The bimetallic actuator 28 is mounted to the bridge member 30 by means of its tongue 37 which passes between two folded-over ears 38 of the bridge member 30 and over a folded-up ramp 39 thereof which enters an aperture in the tongue 37. The portion 41 of the bridge member 30 which carries the bimetallic actuator 28 is longitudinally offset from the side arms 42 of the bridge member so as to provide necessary clearance between the periphery of the actuator and the bridge member for the actuator to reverse its curvature by snap-action and to permit the necessary movement of the bridge portion 32 of the actuator. In addition, as seen most clearly in FIG. 4, the portion 41 which carries the ears 38 and the ramp 39 is at an acute angle to the vertical wall of the head 2 so as to ensure that lower peripheral portion 31 of the actuator 28 is in intimate contact with the protrusion 43. The actuator 28 is mounted on the bridge member 30 by lifting the bridge portion 32 over the ears 38 while sliding the tongue 37 between the ears 38 and over the ramp 39. Once the ramp 39 enters the tongue aperture 40, the actuator is retained in place. However, should an actuator malfunction during testing of the control, it may conveniently be replaced simply by deforming the free end of the tongue clear of the end of the ramp and there is no need to replace any of the other parts of the control.

The stainless steel bridge member 30, having a relatively low thermal conductivity and heat capacity, minimises heat-loss from the actuator 28 and as such the actuator reacts quickly to overheating of the element. Furthermore, the bridge member mounting accurately aligns the actuator with the wedge-shaped protrusion 43 of the head thus ensuring correct relative positioning of the actuator relative to the head and ensuring that a substantial proportion of the lower face of the actuator is in contact with the protrusion 43. The thermal transfer between the head and the actuator can be improved by the addition of a suitable heat transfer medium.

Figure 5:
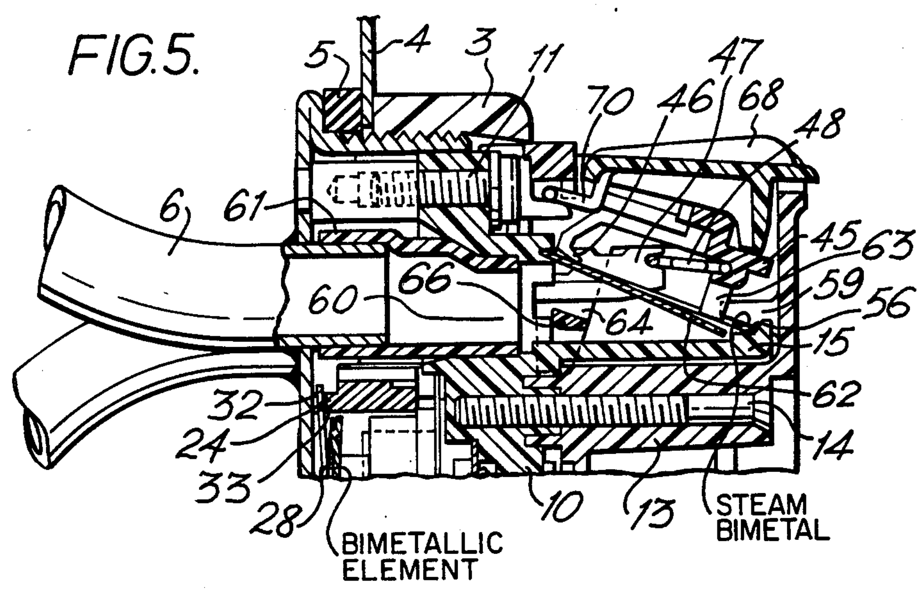
FIG. 5 is a view similar to FIG. 4 but showing the overcentre mechanism in the operational position.
Figure 6:
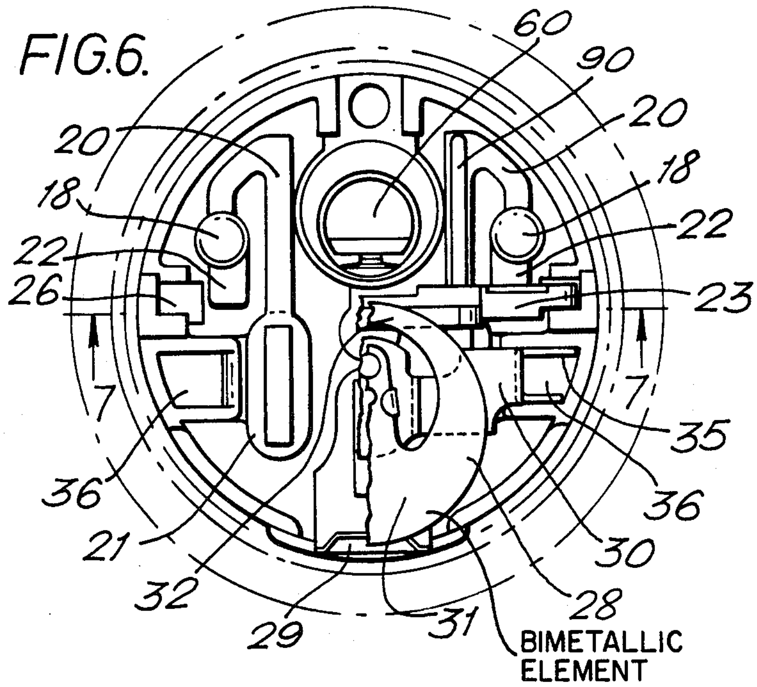
FIG. 6 is an elevational view, partly broken away, of the end of the control adapted to be secured to the immersion heater head.

The overcentre spring mechanism 44 is disposed above the shelf member 15 on the side of the body portion remote from the element head i.e. above the axial horizontal plane of the control. The mechanism 44 includes a lever member 45 having a generaly semicylindrical profile so as to fit snugly within the upper segmental space of the control. The lever member 45 is pivotably mounted to the body portion by means of two knife edges 46 formed integrally with the member 45 which engage in respective pivot notches 51 formed respectively in spaced arms 47 extending from the body portion 10 in a direction parallel to the shelf member 15. An overcentre spring 48 extends between notches 49 formed at the free ends of the arms 47 and notches 50 formed in the lever member 45 in the end thereof remote from the knife edges 46 and biases the knife edges 46 into engagement with the pivot notches 51. As illustrated in FIG. 10, the wire spring 48 is a combined double spring and includes two U-shaped portions 80,81 disposed in back-to-back relation. Each U-shaped portion interconnects a pair of generally parallel arms 82,83, one of which arm 83 is common to both U-shaped portions. The spring imparts a symmetrical biasing force on the lever member 45 and is sufficiently low rate to adequately accommodate the pivotal movement of the member 45. The lever member 45 is pivotable between a first stable position as shown in FIG. 5 wherein a lower surface of the lever member 45 engages stops 53 formed on the free ends of the arms 47 and a second stable position shown in FIG. 4. In moving from the first stable position to the second, the lever member 45 passes through an unstable dead centre position in which the spring notches 49, 50 and the knife edges 46 all lie in a common horizontal plane.

A bimetallic actuator 56 similar to the actuator 28 but having a nominal operating temperature of 80° C. is located below the lever member 45 and lies at an acute angle to the shelf member 15 between the arms 47 which engage the outer periphery of the actuator 56 and serve to locate the actuator laterally. The base of the actuator 56 rests on support members 57 of the body portion and is retained longitudinally by a projection 58 at the end of the shelf member which abuts the bridge portion of the actuator 56. A small cut-out 100 is provided on the outer periphery of the actuator and is engaged to a small projection on the body 10 to prevent rotation of the actuator. During assembly, the actuator is simply dropped into position and is later secured in place when the cover member 13 is mounted by means of flanges 59 thereof which extend over the bridge portion of the actuator 56 thereby clamping it to the shelf member 15. Thus, as with the actuator 28, the actuator 56 may conveniently be replaced during testing if it malfunctions in some way.

Steam or vapour resulting from liquid within the container boiling is transmitted to the actuator 56 via an aperture 60 formed in the body portion 10. The steam tube 6 is sealed to the aperture 60 by means of a silicone rubber sleeve 61 one end of which is stretched over the end of the tube 6 and the other end of which is pushed into the aperture 60. The upper wall of the aperture 60 is upwardly tapered at the side adjacent the head. The lower wall however has no such taper as it has been found that this can result in condensed liquid collecting at adjacent the tube outlet which in turn can lead to blocking of the tube. It will be seen that the tapered sleeve 61 permits use of a wider bore of steam tube as compared with known arrangements wherein the tube has been of smaller radius than the aperture and has been sealed within the aperture by means of O-ring seals. In the preferred embodiment, a steam pipe having an external diameter of 8 mm is used whereas with known arrangements the diameter is typically restricted to 5 mm. Furthermore with known arrangements the positioning of the steam tube relative to the head has been very critical in order to ensure that the end of the tube precisely aligns with the aperture. The use of a flexible sleeve avoids the fine tolerances otherwise involved and thus represents a considerable advantage to the heater manufacturer since the steam tube is generally brazed to the head and brazing is not inherently a precision operation.

Upon liquid within the container boiling, steam or vapour impinges on the steam sensitive bimetallic actuator 56 which then reverses its curvature by snap-action so that its tongue 62 engages and bears upwardly against a post 63 extending downwardly from the lever member 45 thus tripping the lever member 45 from its first stable position to its second stable position. The lever member 45 includes two downwardly projecting legs 64 which extend either side of the shelf member 15 and terminate within notches 65 formed in the longitudinal arms 25 of the 'U'-shaped link member 23. A strengthening bridge 66 extends between the legs 64 and passes between the body portion arms 47 and shelf member 15. Thus, upon the lever member 45 being tripped from its first stable position to its second stable position the legs 64 thereof engage the ends of the notches 65 and pull the link member 23 rightwardly away from the element head and open the switch contacts as described above. The effect is that when the liquid within the container boils the actuator 56 trips the lever member 45 from its first to its second position thereby opening the switch contacts and de-energising the heating element.

As described above, the steam or vapour is shielded from the electrical components on the side of the body portion facing the head by means of the resilient sleeve 61. On the lower side of the body portion, the terminal pins 16 are shielded from steam and from condensed liquid by the shelf member 15 and by the cover member shroud 17. Liquid condensing on the shelf member 15 runs off the member at each side into a peripheral passage defined between the shroud 17 and the outer wall of the cover member 13. An aperture 67 is provided at the base of the cover member to allow condensed liquid within the peripheral passage to drain out of the control. The shroud forming portion of the cover member cooperates with the body portion to form a capillary seal 101 therebetween to prevent liquid seeping into contact with the terminal pins.

A knob 68 is pivotably mounted above the lever member 45 for manually resetting the control after the overcentre mechanism has been tripped as a result of liquid within the container boiling. The knob 68 is mounted by means of a flange 70 thereof which is held between a shoulder 69 projecting from the body portion and part of the cover member. When the knob 68 is pressed downwardly, the lever member 45 is returned to its first position thus allowing the movable contacts 18 to move into contact with the respective stationary contacts 19 and the electrical power supply to the element can be resumed. The length of the notches 65 on the longitudinal arms 25 of the U-shaped link member is such that upon movement thereof due to operation of the switch-on-dry sensitive actuator 28 the lever member 45 is tripped slightly after the contacts are opened. Thus, if an attempt is made to energise the heater with no liquid in the container by manually holding the knob in the closed position, the actuator 28 will cycle causing the contacts to open and close thus preventing serious overheating of the element.

A further advantage is provided by the resiliency of the mounting of the lever member. As shown in FIG. 5, during normal operation of the heater there is a slight clearance between the tongue 62 of the steam sensitive actuator and the post 63 of the lever member. Such a clearance reduces the possibility of nuisance tripping of the lever member due to slight fluctuations of the tongue 62. However, the resiliency of the lever member mounting allows the knob to be manually displaced slightly below its normal operational position shown in FIG. 5 thus causing the post 63 to engage and urge downwardly the actuator tongue 62. This enables the steam sensitive bimetallic actuator to be reset more quickly after steam switch off has occurred.

The embodiment of the control illustrated herein is particularly suitable for sale ready-mounted to an immersion heater carrying a steam tube as a replacement element for home-fitting. However, the control may be readily adapted for use with different containers and immersion heaters. For example, the steam tube might be emitted and the control adapted to receive steam from above. In this case, the steam aperture 60 of the body portion 10 would simply be blocked and the steam would be introduced to the acturator 56 from above via a cut-away portion 71 at the top of the lever member 45. Alternatively, the preferred control may serve solely as a switch-on-dry protector unit simply by omitting the over-centre mechanism and associated actuator.

A preferred immersion heater 72 includes a brass baffle 73 brazed to the steam tube 74 adjacent the inlet 75 thereof. Around inlet 75, the baffle 73 includes a lower portion 76 and an upper portion 77 which respectively protect the inlet of the tube from liquid bubbling into the inlet during boiling and from liquid entering the tube during filling of the container.

The baffle 73 further includes a vertical portion 78 which extends downwardly to the element and is brazed thereto. The vertical portion 78 serves generally to support the steam tube against physical damage during transport or installation and furthermore, may conveniently be provided with horizontal shelf sections 79 and 80 bearing minimum and maximum water level indicator marks. The inclusion of the level marks is important where the heater is sold as a replacement element since when the element of a container is changed the original level marks on the container wall may well no longer apply.

We claim:

1. A thermally-sensitive electrical control for an electric immersion heater for containers, the immersion heater having a heating element carried by a head adapted to be secured in a watertight manner in or adjacent an opening in a container wall, the heating element terminating in cold leads by means of which electrical connections are made to the heater, said control being adapted to be mounted on the head of an immersion heater and having an outer periphery of less radial extent than a peripheral portion of the head so as to be passable through the opening in a wall of a container whereby the head may be positioned in or adjacent the opening with the control mounted thereon by insertion of the control through the opening from inside the container, said control comprising:

(a) a body portion having a generally axial plane which includes a longitudinal axis of the body portion, the longitudinal axis extending generally perpendicular to the plane of the opening;
(b) electrical switch means mounted to the body portion adapted to interrupt the power supplied to the heating elements;
(c) first and second thermally responsive actuating means connected to the electrical switch means for operation thereof upon the element overheating and upon liquid within the container boiling, at least the second actuating means being mounted on the control and acting on the electrical switch means through an over-centre spring mechanism and being adapted to be exposed in use to steam or vapour resulting from liquid within the container boiling;
(d) means shielding the electrical switch means from such steam or vapour; and,
(e) terminal pins mounted on the body portion having free end portions adapted to be engaged by a separate socket connector for connecting the heating element via said electrical switch means to a source of electrical power, said electrical switch means and said first actuating means being disposed on a first side of the body portion, which first side faces the head of a heater when mounted thereto, said over-centre spring mechanism and said second actuating means being mounted to a second, opposite side of the body portion and being disposed on one side of said generally axial plane, the free end portions of the terminal pins being disposed on the opposite side of said generally axial plane generally opposite said over-centre spring mechanism and said second actuating means.

2. A thermally-sensitive electrical control as claimed in claim 1 wherein the body portion includes a shelf member which is substantially parallel to and closely adjacent said axial plane, the free end portions of the terminal pins and the overcentre spring mechanism being disposed on opposite sides of the shelf member.

3. A thermally-sensitive electrical control as claimed in claim 1 or 2 comprising three terminal pins arranged in a generally triangular relationship, a central earth pin of said terminal pins being disposed more closely adjacent the outer periphery of the control than the other pins.

4. A thermally-sensitive electrical control as claimed in claim 1 wherein said first thermally responsive actuating means is mounted so as to be spaced from and overlie the terminal pins of the control.

5. A thermally-sensitive electrical control as claimed in claim 1 wherein the electrical switch means is coupled to the first actuating means and to the over-centre spring mechanism by a link member which is slidably mounted to the body portion so as to be slidable relative thereto generally parallel to said axial plane.

6. A thermally-sensitive electrical control as claimed in claim 5 wherein the electrical switch means includes two movable contacts respectively mounted to free ends of two generally U-shaped leaf springs formed from resilient strip material, the movable contacts being adapted to engage and make electrical contact with a pair of stationary contacts during normal use of the heater.

7. A thermally-sensitive electrical control as claimed in claim 6 wherein the link member is generally U-shaped and comprises a transverse arm located on said first side of said body portion and adapted for engagement with the free ends of the leaf springs, and two spaced longitudinal arms attached to the transverse arm and extending away from the over-centre spring mechanism through channels defined in the body portion to the opposite side thereof remote from the switch means.

8. A thermally-sensitive electrical control as claimed inclaim 7 wherein the link member is adapted to be acted on by the over-centre spring mechanism and the first actuating means, and is displaceable in a direction away from the heater head to thereby engage the leaf springs and open at least one of the contacts so as to interrupt the power supply to the heating element.

9. A thermally-sensitive electrical control as claimed in claims 6, 7 or 8 wherein the leaf springs are adapted to be secured at their ends remote from the contacts to respective ones of the terminal pins.

10. A thermally-sensitive electrical control as claimed in claims 6, 7 or 8 wherein said stationary contacts are adapted to be mounted directly to respective cold leads of the immersion heater.

11. A thermally-sensitive electrical control as claimed in claim 10 wherein the stationary contacts are adapted to be mounted to the cold leads by means of cylindrical sleeves secured to the contacts.

12. A thermally-sensitive electrical control as claimed in claim 6 wherein the contacts are arranged to be independently breakable in response to operation of the first actuating means.

13. A thermally-sensitive electrical control as claimed in claim 1 wherein the over-centre spring mechanism includes a lever member pivotably mounted on the body portion so as to be movable between first and second stable positions through an unstable dead centre position and an over-centre spring mounted between the lever member and the body portion to bias the lever to its first and second stable positions.

14. A thermally-sensitive electrical control as claimed of claim 13 wherein the dead centre position of the lever member occurs when the ends of the over-centre spring lie approximately parallel to the axial plane.

15. A thermally-sensitive electrical control as claimed in claim 13 or 14 wherein the lever member is pivotally mounted to the body portion by means of at least one knife edge portion formed on the lever member engaging in a notch defined by the body portion and being retained therein by means of the over-centre spring extending between the lever member and the body portion.

16. A thermally-sensitive electrical control as claimed in claim 15 wherein said over-centre spring comprises a wire spring having two spring arms oriented generally parallel when the spring is in its mounted position, the spring arms interconnected by generally 'V' or 'U' shaped portions lying in the plane of and disposed between the parallel spring arms.

17. A thermally-sensitive control as claimed in claim 16 wherein the lever member includes two laterally spaced knife edge portions respectively resting in notches formed in two spaced mounting arms projecting from the body portion on the opposite side thereof remote from the switch means, said over-centre spring comprising a combined double spring, one said two spring arms being common to both springs so that said two 'U' or 'V' shaped portions are disposed in back-to-back relation.

18. A thermally-sensitive electrical control as claimed in claim 17 wherein said spaced mounting arms include abutments which cooperate with the lever member so as to define stops for said first and second stable positions.

19. A thermally-sensitive electrical control as claimed in claim 13 wherein the over-centre spring mechanism is coupled to the electrical switch means by means of a link member slidably mounted to the body portion so as to be slidable with respect thereto, the link member having two spaced longitudinal arms extending through apertures defined by the body portions from the opposite side of said body portion to the side thereof remote from the electrical switch means, the lever member including two spaced legs which are adapted for engagement with abutments formed on respective longitudinal arms of the link member, whereby upon the lever member being tripped from its first stable position to its second, the legs thereof engage such abutments on the longitudinal arms and pull the link member in a direction away from the immersion heater head, thereby opening the electrical switch means.

20. A thermally-sensitive electrical control as claimed inclaim 19 wherein said abutments are defined by the ends of respective grooves formed in said longitudinal arms.

21. A thermally-sensitive electrical control as claimed in claim 1 wherein the first thermally-sensitive actuating means comprises a snap-acting bimetallic actuator in the form of a stressed sheet of bimetal having a dished configuration which will snap between two oppositely dished configurations at certain operating temperatures, the sheet of bimetal having a U-shape portion cut away to define a central tongue and a margin portion adjacent the free end of the tongue.

22. A thermally-sensitive electrical control as claimed in claim 21 wherein the bimetallic actuator is mounted by means of a bridge member which is adapted to be clamped between the heater head and the body portion at either side of the terminal pins and which extends across the pins such that the actuator overlies and is spaced from said pins.

23. A thermally-sensitive electrical control as claimed in claim 22 further comprising mounting means to removably secure the bimetallic actuator to the bridge member such that it may be attached and removed without damaging the bridge member or the bimetallic actuator.

24. A thermally-sensitive electrical control as claimed in claim 23 wherein the mounting means comprises two folded over ears formed on the bridge member which embrace the edges of the actuator tongue, and a small ramp formed on the bridge member which enters a small aperture defined in the tongue when the tongue is inserted between the ears.

25. A thermally-sensitive electrical control as claimed in claims 22, 23 or 24 wherein the bridge member is made of a material of low thermal conductivity and/or heat capacity.

26. A thermally-sensitive electrical control as claimed in claim 21 wherein the electrical switch means is coupled to the bimetallic actuator and to the over-centre spring mechanism by means of a link member slidably mounted to the body portion so as to be slidable relative thereto, the bimetallic actuator being mounted so that the margin portion thereof adjacent the free end of the tongue is adapted to be engagable with the link member, and the operative part of the bimetallic actuator in the region of the root of the tongue is adjacent the periphery of the control.

27. A thermally-sensitive electrical control as claimed in claim 1 wherein the second thermally responsive actuating means comprises a snap acting bimetallic actuator mounted on the body portion of the control so as to lie at an acute angle to said axial plane.

28. A thermally-sensitive electrical control as claimed in claim 1 wherein said heater head carries a tube having an outlet for the egress of steam or vapor from inside the container, wherein said body portion defines an aperture through which steam or vapour emitting from the tube outlet may pass and which aperture communicates with the second actuating means.

29. A thermally-sensitive electrical control as claimed in claim 28 wherein a seal between the tube outlet and said aperture is adapted to be effected by means of a resilient sleeve, one end of which is adapted to engage around the tube and the other end of which is disposed within the aperture.

30. A thermally-sensitive electrical control as claimed in claim 29 wherein the aperture is outwardly tapered at its end to faciliate acceptance of the resilient sleeve.

31. A thermally-sensitive electrical control as claimed in claim 1 wherein the immersion heater has an externally threaded cup-like head adapted to be inserted through a container opening and be retained therein by an externally mounted locking ring, wherein the body portion has a generally cylindrical peripheral wall and is adapted to be securable within said head.

32. A thermally-sensitive electrical control as claimed in claim 31 wherein one of the terminal pins of the control is an earth terminal pin electrically connected to the head by means of a resilient conductive strip which is mounted to the earth pin and is adapted to bear against the inside of the cup-like head when the control is mounted thereto.

33. A thermally-sensitive electrical control as claimed in claim 1 further comprising a cover member mounted to the body portion such that it encloses the over-centre spring mechanism and defines a shroud which surrounds the terminal pins.

34. A thermally-sensitive electrical control as claimed in claim 33 further comprising a shelf member cooperating with the shroud defined by said cover member so as to shield the terminal pins from steam or vapour impinging on the second thermally responsive actuating means.

35. A thermally-sensitive electrical control as claimed in claim 33 or 34 wherein the cover member is mounted to the body portion by means of a single central fixing bolt.

36. A thermally-sensitive electrical control as claimed in either of claims 33 or 34 wherein the cover member is adapted to be passable through the opening in the wall of an associated container.

37. A thermally-sensitive electrical control for an electric immersion heater, the immersion heater having a heating element carried by a head, the heating element terminating in cold leads by means of which electrical connections are made to the heater, said control comprising:

(a) a body portion having a generally axial plane which includes a longitudinal axis of the body portion;

(b) electrical switch means mounted to said body portion and adapted to selectively interrupt power supplied to the heating element;

(c) first and second thermally responsive snap acting bimetallic actuators connected to said electrical switch means for operation thereof, said second bimetallic actuator acting on said electrical switch means through an over-centre spring mechanism and being adapted to be exposed to steam or vapour; and, (d) terminal pins having bases and free end portions and adapted to be engaged by a separate socket connector for connecting the heating element via the electrical switch means to a source of electrical power, said electrical switch means and said first bimetallic actuator being disposed on a first side of the body portion which first side faces the head of the heater when mounted thereto, the first bimetallic actuator overlying and being spaced from the bases of the terminal pins, said over-centre spring mechanism and said second bimetallic actuator being mounted to a second, opposite side of the body portion and being disposed to one side of said generally axial plane of said body portion with the second bimetallic actuator lying at an acute angle to said axial plane, the free end portions of the terminal pins being disposed on the other side of said generally axial plane generally opposite said over-centre spring mechanism and said second bimetallic actuator.

38. A thermally-sensitive electrical control as claimed in claim 37 wherein the first bimetallic actuator is mounted by means of a bridge member adapted to be clamped between the heater head and the body portion at either side of the terminal pins and which extends across bases of the pins.

39. A thermally-sensitive electrical control for an electric immersion heater for containers, the immersion heater having a heating element carried by a head adapted to be secured in a watertight manner in or adjacent an opening in a container wall, the heating element terminating in cold leads by means of which electrical connections are made to the heater, said control being adapted to be mounted on the head of an immersion heater and having an outer periphery of less radial extent than a peripheral portion of the head so as to be passable through the opening in a wall of a container whereby the head may be positioned in or adjacent the opening with the control mounted thereon by insertion of the control through the opening from inside the container, said control comprising:

(a) a body portion having a generally axial plane which includes a longitudinal axis extending generally perpendicular to the plane of the opening;

(b) electrical switch means mounted to said body portion and adapted to interrupt power supplied to the heating element;

(c) first and second thermally responsive actuating means connected to said electrical switch means for operation thereof via a link member slidably mounted to the body portion, said first and second thermally responsive actuating means operable upon overheating of the heating element and upon a liquid within the container boiling, at least said second thermally actuating means mounted on the body portion so as to act on said link member through an over-centre spring mechanism and adapted to be exposed in use to steam or vapour resulting from liquid within the container boiling;

(d) means shielding the electrical switch means from such steam or vapour;

(e) terminal pins mounted on the body portion having free end portions and adapted to be engaged by a separate socket connector for connecting the heating element via the electrical switch means to a source of electrical power, said electrical switch means and said first actuating means being disposed on a first side of the body portion which first side faces the head of a heater when mounted thereto; said over-centre spring mechanism and said second actuating means being mounted to a second, opposite side of the body portion and being disposed to one side of said generally axial plane, the free end portions of the terminal pins being disposed to the other side of said generally axial plane generally opposite said over-centre spring mechanism and said second actuating means.

40. A thermally-sensitive control as claimed in claim 39 wherein the electrical switch means includes two movable contacts respectively mounted to free ends of two generally U-shaped leaf springs formed from resilient strip material, the movable contacts being adapted for engagement with a pair of stationary contacts electrically connected to the heating element, and wherein the link member is generally U-shaped, having a transverse arm adapted for engagement with the free ends of the leaf springs and two spaced longitudinal arms extending through channels defined in the body portion to said opposite side thereof, the first thermally responsive actuating means adapted to be engagable with said longitudinal arms, such that the link member is displaced in response to operation of either thermally responsive actuating means away from the heater head so as to engage the free ends of the leaf springs and open at least one of the contacts.

41. An electric immersion heater for containers comprising:

(a) a heating element carried by a head adapted to be secured in a watertight manner in or adjacent an opening in a container wall, the heating element terminating in cold leads by means of which electrical connections are made to the heater; and (b) a thermally-responsive electrical control adapted to be mounted on the head of the immersion heater and having an outer periphery of less radial extent than a peripheral portion of the head so as to be passable through an opening in a wall of a container whereby said head may be positioned in or adjacent the opening with the control mounted thereon by insertion of the control through the opening from inside the container, said control comprising: (i) a body portion having a generally axial plane which includes a longitudinal axis of the body portion, the longitudinal axis extending generally perpendicular to the plane of the opening; (ii) electrical switch means mounted to said body portion adapted to interrupt power supplied to the heating element; (iii) first and second thermally responsive actuating means connected to said electrical switch means for operation thereof upon the element overheating and upon liquid within the container boiling, at least said second actuating means being mounted on the control and acting on said electrical switch means through an over-centre spring mechanism and being adapted to be exposed to steam or vapour resulting from liquid within the container boiling; (iv) means shielding the electrical switch means from such steam or vapour; and (v) terminal pins mounted on the body portion having free end portions adapted to be engaged by a separate socket connector for connecting the heating element via said electrical switch means to a source of electrical power, said electrical switch means and said first actuating means being disposed on a first side of the body portion which first side, faces the head of a heater when mounted thereto, said overcentre spring mechanism and said second actuating means being mounted to a second, opposite side of the body portion and being respectively disposed to one side of said generally axial plane the free end portions of the terminal pins being disposed to the other side of said generally axial plane generally opposite said over-centre spring mechanism and said second actuating means.

42. A container comprising:

(a) an electric immersion heater having a heating element carried by a head adapted to be secured in a watertight manner adjacent an opening in a container wall, the heating element terminating in cold leads by means of which electrical connections are made to the heater; and (b) a thermally sensitive electrical control being mounted on the head of the immersion heater and hving an outer periphery of less radial extent than a peripheral portion of the head so as to be passable through the opening in a wall of the a container whereby the head may be positioned adjacent the opening with the control mounted thereon by insertion of the control through the opening from inside the container, in said control comprising: (i) a body portion having a generally axial plane which includes a longitudinal axis of the body portion, the longitudinal axis extending generally perpendicular to the plane of the opening; (ii) electrical switch means mounted to the body portion and adapted to interrupt power supplied to the heating element; (iii) first and second thermally responsive actuating means connected to said electrical switch means for operation thereof, upon the element overheating and upon liquid within the container boiling, at least said second thermally responsive actuating means being mounted on the control and acting on said switch means through an over-centre spring mechanism and being exposed in use to steam or vapour resulting from liquid within the container boiling; (iv) means shielding the electrical switch means from such steam or vapour; and, (v) terminal pins mounted on the body portion having free end portions adapted to be engaged by a separate socket connector for connecting the element via said electrical switch means to a source of electrical power, said electrical switch means and said first thermally responsive actuating means being disposed on a first side of the body portion which first faces the head of a heater when mounted thereto, said, over-centre spring mechanism and said second actuating means being mounted to a second opposite side of a body portion and being respectively disposed to one side of said generally axial plane the free end portions of the terminal pins being disposed to the other side of said generally axial plane generally opposite said over-centre spring mechanism and said second actuating means.

43. In a thermally-sensitive electrical control for an electric immersion heater for a container, the immersion heater having a heating element carried by a head adapted to be secured in a water-tight manner in or adjacent an opening in a wall of a container, the head having a tube for the egress of vapour from inside the container upon boiling of a liquid therein, said control being adapted to be mounted on the head of the immersion heater and having an outer periphery of less radial extent than a peripheral portion of the head so as to be passable through an opening in a wall of a container so that the head may be positioned in or adjacent the opening with the control mounted thereon by insertion of the control through the opening from inside the container, the improvement comprising:

(a) a body portion having a generally axial plane which includes a longitudinal axis of the body portion, the longitudinal axis extending generally perpendicular to the plane of the opening;

(b) electrical switch means mounted to said body portion and adapted to interrupt power supplied to the heating element;

(c) first and second actuating means connected to said electrical switch means for operation thereof upon the element overheating and upon a liquid with the container boiling, at least said second actuating means being mounted on the control and acting on the electrical switch means through an over-centre spring mechanism;

(d) a resilient sleeve adapted to engage the end of said tube on the head, said resilient sleeve disposed within an aperture formed in the body portion and communicating with the second actuating means whereby the second actuating means is exposed to steam or vapour resulting from a liquid within the container boiling;

(e) means shielding the electrical switch means from such steam or vapour;

(f) terminal pins mounted on the body portion having free end portions and adapted to be engaged by a separate connector for connecting the heating element via said electrical switch means to a source of electrical power; and (g) means mounting the first actuating means to a first side of the body portion which first side, faces the head of a heater when mounted thereto so as to be in good thermal contact therewith, said over-centre spring mechanism and said second actuating means being spaced from the head and being disposed to one side of said generally axial plane, the free end portions of the terminal pins being disposed to the other side of said generally axial plane generally opposite said over-centre spring mechanism and said second actuating means.

* * * * *